Nov. 14, 1972   W. T. HOUGH   3,702,820

SOLVENT EXTRACTION INTO COMESTIBLE SOLUTE

Filed March 27, 1970

United States Patent Office 3,702,820
Patented Nov. 14, 1972

3,702,820
SOLVENT EXTRACTION INTO COMESTIBLE SOLUTE
William T. Hough, 312 S. Finley Ave., Basking Ridge, N.J. 07920
Continuation-in-part of application Ser. No. 816,765, Apr. 16, 1969. This application Mar. 27, 1970, Ser. No. 23,434
Int. Cl. B01d 13/00
U.S. Cl. 210—22                          9 Claims

ABSTRACT OF THE DISCLOSURE

A process for desalting of sea water by regular (natural) osmosis of water from sea water into a more concentrated comestible solution of a comestible food, to form a diluted comestible solution, preferably—before consumption thereof—retaining said diluted comestible solution in a consumption vessel such as a cup, a glass, canteen, or bowl, or the like, from which said diluted solution is consumable.

---

Figure 1:
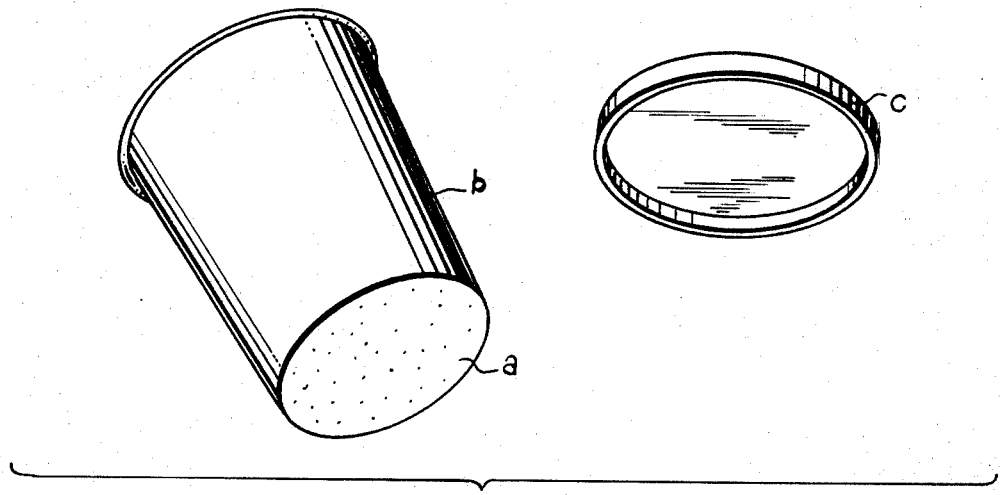

This is a continuation-in-part of application U.S. Ser. No. 816,765 filed Apr. 16, 1969, which is hereby incorporated by reference in its entirety.

This invention relates to a process by which solvent having solute(s) dissolved therein which are not easily and/or economically removable therefrom may be extracted into a more concentrated solution of a comestible (eatable or potably drinkable) food, for example.

BACKGROUND

Within recent years, increases in population and the continued expansion of old industries and the development of new industries have cumulatively contributed to the growing need for new and inexpensive sources of both palatable (potable) water for drinking purposes and industrial water sufficiently free of salt and minerals in general normally found in sea water and other sources of saline water, to permit industrial use of the water.

Many diverse methods have been employed to obtain water which is free of objectionable salts.

The probably oldest typical example is a process employing dsitillation. However, because of the expense of about $1.10 per 1000 gallons as a result of the heat required for distillation, this method has been impractical for the production on a commercial scale of large quantities of water over an indefinite but extended period of time. In the absence of more satisfactory and less expensive methods, it has been necessary in many cases to continue use of the unsatisfactory distillation method.

Other typical methods concurrently being employed, but at great expense, are the ion-exchange and electrodialysis methods whereby the salt is withdrawn from the saline solution. Electrodialysis is a unit process that uses an induced electric current to separate the cationic and anionic components of a salt solution; it relies on the use of membranes that permit ions to pass from dilute to concentrated solution. At about 35% of full operation of an electrodialysis operation, the cost is about 63¢ per 1000 gallons of water product produced, and at about 98% of full operation costs about 33¢ per 1000 gallons of water; these typical costs are involved in reducing salt concentration from about 2075 parts per million (p.p.m.) to about 500 p.p.m. In another typical electrodialysis operation, at 65% full operation, the cost is $1.95/1000 gallons or at 90%, $1.35/1000 gallons, in reducing salt content from about 1700 p.p.m. to about 300 p.p.m.

Another method that has been employed with very little success insofar as practical commerical feasibility because of the continued high costs involved, is the ultra-filtration method commonly known as "reverse osmosis," in which pressures up to about 600 pounds per square inch (p.s.i.) are exerted on a saline solution having an osmotic (filtering—not technically related to osmosis) membrane adjacent thereto and in intimate contact therewith whereby water is forced from the saline solution through the osmotic membrane into a collecting vessel on the opposite side of the partitioning osmotic membrane from which the water is withdrawn in a salt-free state, theoretically; as a matter of fact, typically salt also is forced through the membrane to the extent of about 500 p.p.m. in the desalinization of a mere concentration of about 2500 p.p.m. of salt. Because of the excessively large pressure required for reverse osmosis, the pressure rapidly destroys the initial efficiency of the membranes, even though many devices have been tried and/or employed to reinforce the membranes. A typical reverse osmosis process ranges from about 13 to 22 gallons per square foot per 24 hours, typically at allegedly seven to sixteen cents less expense than electrodialysis, but at one installation at about 35¢ to 90¢ per 1000 gallons in lowering from 2500 to 500 at 600 p.s.i. and at another installation at about 50¢ to 70¢ per 1000 gallons in lowering from about 2500 p.p.m. to 500 p.p.m. at 600 p.s.i.

Another method being employed is multi-stage flash desalination at one installation at about 65¢/1000 gal. in lowering from 35,000 p.p.m. to about 5 p.p.m. and at another installation at about 85¢/1000 in lowering from about 35,000 p.p.m. to about 10 p.p.m.; this cost is economically unattractive.

Another typical method currently employed is a vaporization method in which splashing water (containing objectionable material such as salt) produces increased vapor pressure which is subsequently condensed in the form of a relatively salt-free water by means of contacting the vapor with a smooth surface whereby the condensed moisture is collected separately from the agitated saline water. Such a process requires sufficient energy to agitate the saline water as well as the heat of vaporization and unfortunately obtains only a very low yield of condensed moisture relative to the time and energy expended.

Within recent years, with the development of refined methods of employing atomic energy and in the absence of more satisfactory and economical methods of obtaining salt-free water, nuclear energy has been employed in combination with the distillation method discussed above. However, due to the continued high cost of nuclear energy and the expensive plants and safety controls necessary for its employment, and because nuclear energy plants cannot be randomly employed in every area of need independent of the economics of the situation, atomic energy has not provided the answer to the continuing need for a practical and economical source of salt-free water.

OBJECTS

It is an object of this invention to provide a process for obtaining a solvent which is free of objectionable solute in solution therein.

Another object is to obtain a process which does not require a large input of energy, but yields a high efficiency.

Another object is to obtain water which is substantially free of objectionable salts and/or other objectionable materials or minerals in solution therein.

Another object is to obtain a process for producing water which is free of objectionable salt, on a large scale production of the salt-free water.

Another object is to obtain a process for producing water which is free of objectionable salt dissolved therein, at a sufficiently low cost that the process is economically feasible for large scale production of salt-free water.

Another object is to obtain a process for producing water which is free of objectionable salt dissolved therein, which process does not require a large and/or expensive plant facility.

Another object is to obtain a process for producing water which is free of objectionable salt dissolved therein, which may be employed in diverse locations in the world irrespective of the lack of conventional resources.

Another object is a process which by the employment of a select class of solutes may extract potable water directly from an unusable (non-palatable or non-potable) water source such as sea water and be thereafter consumed without further processing.

Another object is an article for easily and economically practicing the above process without the requirement of extensive equipment and/or resources, and in a form easily transportable by an individual person, for example, when traveling to or camping in remote areas.

Other objects become apparent from the above and following disclosure.

SUMMARY OF THE INVENTION

The objects of this invention are accomplished by a process comprising passing by osmosis, water from an aqueous solution of a first solute comprising a water soluble composition, through an osmotic semipermeable structure into a comestible solution of a water-soluble comestible solution to form a diluted comestible solution, said passing comprising placing said water into intimate contact with a face of said osmotic structure and placing, into intimate contact with an opposite face of said osmotic structure, said comestible solute and solution thereof being isolated from said water, except for the osmotic structure through which the water is passable, when the water is in the liquid phase. In particular, the comestible solute may be any eatable or potable solute. The process normally and preferably includes, before consumption of the diluted comestible solution, retaining said diluted comestible solution in a sanitary consumption vessel from which the diluted comestible solution is consumable.

The objects are further accomplished by an article comprising a vessel for containing a liquid, a portion of said vessel's enclosing structure being a non-permeable material, and another portion of said vessel's enclosing structure being an osmotic semipermeable structure. Typically the article comprises a portable drinking vessel having an osmotic membrane or an osmotic ceramic material as an enclosing part of the vessel, such as the vessels base for example, preferably in combination with a comestible solute or solution thereof enclosed therein, the vessel also including another portion of enclosing wall(s) such as, for example, a flexible plastic bag, with the osmotic membrane and/or osmotic ceramic material forming an osmotic port in a face of said flexible plastic bag. The "top" of a vessel, for closing a vessel (particularly for a plastic bag vessel) may constitute the osmotic enclosing wall, within the scope of the invention. The article may be utilized for also any other convenient purpose.

THE FIGURES

FIG. 1 illustrates a cup of a conventional type with wall $b$, except for the bottom thereof $a$ which is a semipermeable membrane, and $c$ is a top cover, which optionally may be of a material which is porous to water but suitable for filtering precipitate.

Figure 2A:
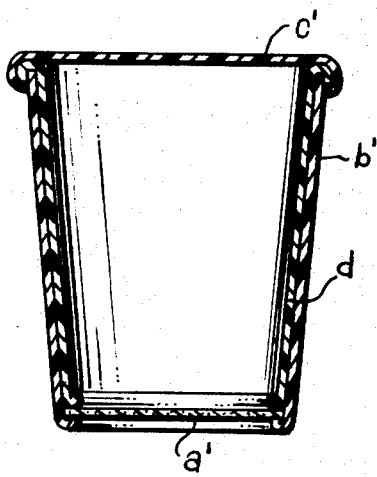
Figure 2B:
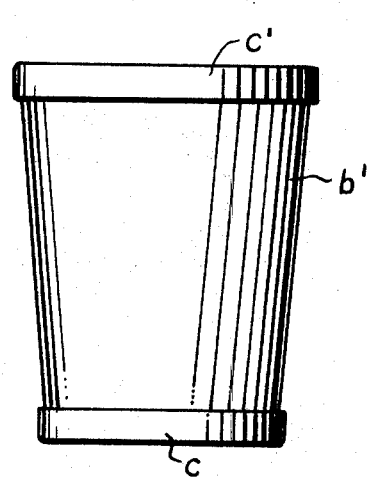

FIG. 2A illustrates a cross-section of another typical embodiment, illustrating the sealed position of the removable top $c$ and a double walled arrangement of walls $b$ and $d$ which thereby secure into a sealed position the semipermeable membrane $a'$ the FIG. 2B illustrates an embodiment in which one cover seals the top but is removable, and another cover seals the bottom to keep sanitary the bottom and to prevent the bottom from being exposed to moisture or a liquid before desired; the top cover is designated $c'$, the cup wall is designated $b'$ (same as in FIG. 2A) and the bottom cover is designated $e$.

Figure 3:
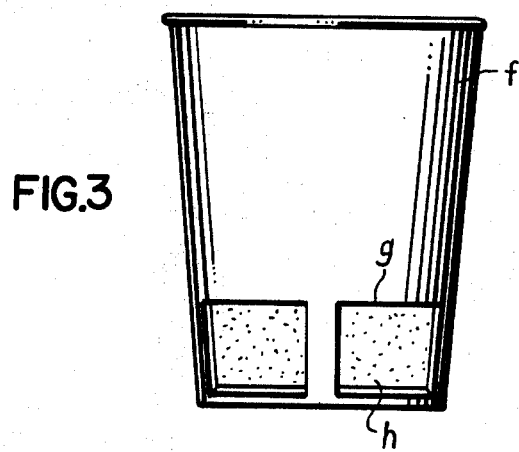

FIG. 3 illustrates another embodiment of the cup, in which the wall of the cup at the base thereof includes windows such as window $g$ filled with semipermeable membrane such as the membrane $h$.

The illustrated cups are suitable for setting within shallow water to permit osmosis to take place through the semipermeable membrane into the solute contained therein, such as a food material.

DETAILED DESCRIPTION OF THE INVENTION

The article of this invention is suitable for the practice of the process described above.

In a preferred embodiment, the osmotic material comprises a ceramic material such as porcelain, thereby providing a sturdy, strong osmotic structure.

In another preferred embodiment, the non-permeable material comprises a flexible material such as a plastic flexible-membrane. Thereby, a concentrated comestible solution, such as regular milk or concentrated milk and/or chocolate syrup, may be sealed within a substantially collapsed and/or folded bag in water or in salt water (or saline) solution, water enters into the bag by osmosis through the osmotic structure, to inflate the bag with the increased volume of the diluted comestible solution. Typical concentrated milk are, insofar as a concentrated solute is concerned, regular milk, cream, powdered-milk solution, natural fruit juice, artificial fruit juice, other artificial drink, concentrated or condensed fruit juice, and the like. Attractively, the bag may be employed alone until the desired time of use, and the concentrated comestible solution added before initiating the osmotic process. Dry solute in the bag may be moistened as is necessary to initiate the osmosis process. Accordingly, the term "comestible solution" also includes solute having enough solvent or moisture therein to initiate osmosis when placed in contact with the osmotic structure (when the opposite face of the osmotic structure is in contact with water and/or an aqueous solution of lesser solute concentration).

A preferred vessel is a cup which has the semipermeable membrane in the base thereof, but which preferably additionally has a removable and sealable top made of a material or composition of typically a conventional type suitable for filtering from water a precipitate in the water, whereby a precipitated solute by the precipitating process of this invention or by any process of the parent applications of which this application is a continuation-in-part may be separated from the potable water at the time that the cup (or other vessel) is poured (the water therein) into another vessel or glass (for example) or is turned up to the person's lips for drinking.

The vessel may be any of conventional material(s) such as any suitable metal or plastic or fibrous or ceramic material, or the like. In a preferred embodiment, the vessel is a cup such as (for example) illustrated in any one or more of the figures, preferably made of paper and/or waxed paper of the conventional type (for example) normally employed in the making of various types of cups. The cup may be of the type capable of enduring hot drink, or alternatively may be of the regular cool or cold water type. A preferred embodiment includes a solute enclosed within the vessel or cup, and the vessel preferably already has a minor amount of water, moisture, or other comestible solvent therein the solute.

It is within the scope of this invention to also include within the cup a suitable purifying agent which will purify the water entering through the semipermeable membrane from the outside water source such as sea water. However, it should be noted that an advantage to filling the cup (or other vessel) by water of osmosis arises from the fact that a semipermeable structure such as a membrane or a ceramic is known to exclude certain bacteria and viruses contained in the outside water.

Also, it is within the scope of this invention and highly desirable to boil the salt water in a container prior to placing the cup in the vessel in which the water was boiled; thereby pure and salt-free water is available by use of the article of this invention.

In a preferred embodiment of this invention, the comestible solute is a human food material of any type, provided it is soluble in the water. Typical and preferred comestible foods include, for example, foods such as powdered milk, carnation milk or other condensed milk, fruit juices or condensed forms thereof, chocolate of any suitable type, but particularly chocolate syrup or cocoa; also, for example, instant foods and/or drinks such as instant coffee, or the like, are suitable. Various concentrated fruit juices and/or sweet syrup, and/or sugars and/or sweetened or non-sweetened drinks are other examples.

By the employment of the process of this invention relating to use of comestible solute, particularly of the nutrient type, it would be possible to carry on camping trips or other trips to remote areas merely sufficient food materials, and thereafter utilize the process of this invention, and preferably the simple article, easily transportable, of this invention as a means of securing potable water in the absence of water supply other than natural (nature) sources.

The above-described process relating to the use of a comestible as a solute preferably includes a second solute in solution in the water to be passed through the osmotic structure, and the comestible solution's comestible solute is sufficiently greater than the second solute water solution that osmosis takes place from the second-solute solution into the comestible solution. The comestible solution is normally and preferably aqueous.

The process normally and typically comprises passing by osmosis water from an aqueous solution of a first solute comprising a water soluble composition, through a semipermeable membrane into a comestible and substantially non-volatile second solute substantially inseparable from liquid phase water, said passing comprising placing said solution of said first solute into intimate contact with a face of said membrane and placing, into intimate contact with an opposite face of said membrane, said comestible solute in an amount sufficiently greater than solute concentration of said first solute that said osmosis takes place. Preferably the aqueous solution comprises substantially sea water containing sea salts.

The process(es) of this invention normally and preferably includes, before consumption of the diluted comestible solution, retaining the diluted comestible solution in a consumption vessel from which said diluted solution is consumable, such as a cup, a glass, a canteen, a bowl, a jug, or the like, followed by consuming the water by an animal being such as a human being or a domesticated animal. The osmotic structure may be a part of the retaining vessel, or the diluted comestible may be transferred from the osmotic vessel to a non-osmotic consumption and/or retaining vessel, for example.

The semipermeable membrane for any of the osmosis processes of this invention may be any suitable material, plastics, ceramics, or otherwise, such as cellulose acetate, porcelain, animal bladder, or any conventional or desirable semipermeable osmotic membrane or structure known in the art or to be later developed.

It should be noted that the processes of this invention are not limited to a scope of merely the use of saline and/or sea water, but may be employed alone or in combination with other known processes for dewatering chemical or other wastes which contaminate water. For example, in regard to either industrial or domestic sewage, a preferred process would pass the polluted water through a filtering device such as any conventional filter or filtering means or process, and thereafter employ the process(es) of this invention to extract water by osmosis.

The invention described above in the preceding specification includes in scope such modifications and/or equivalents as would be obvious substitutes to a person of skill in the art.

I claim:

1. A process comprising passing by osmosis, water from an aqueous solution of a first solute comprising a water soluble composition, through an osmotic semipermeable structure into a substantially non-saline comestible solution of water-soluble comestible solute to form a diluted comestible solution, said passing comprising placing said water into intimate contact with an opposite face of said osmotic structure, said comestible solute and solution thereof being isolated from said water before said osmosis.

2. A process according to claim 1, including, before consumption of said diluted comestible solution, retaining said diluted comestible solution in a consumption vessel from which said diluted solution is consumable.

3. A process according to claim 1, including consuming said diluted comestible solution.

4. A process according to claim 1, in which said passing includes exerting a positive differential pressure on said first solute's solution as compared to pressure on said comestible solution, across said osmotic semipermeable structure.

5. A process according to claim 1, in which said semipermeable structure is impervious to said first solute, and in which said comestible solution prior to osmosis includes said comestible solute in sufficiently greater concentration than said first solute's concentration in said aqueous solution that said passing by osmosis takes place.

6. A process according to claim 5, in which said comestible solution comprises concentrated milk.

7. A process according to claim 3, in which said comestible solution comprises chocolate syrup.

8. A process according to claim 5, in which said structure comprises a ceramic material.

9. A process according to claim 5, in which said first solute comprises salt.

References Cited

UNITED STATES PATENTS

| 444,500 | 1/1891 | Meyer | 127—10 X |
| 1,825,631 | 9/1931 | Horvath | 210—23 |

FOREIGN PATENTS

| 179,919 | 7/1923 | Great Britain | 210—22 |

FRANK A. SPEAR, JR., Primary Examiner

U.S. Cl. X.R.

210—321